(12) United States Patent
Yagyu

(10) Patent No.: US 8,047,655 B2
(45) Date of Patent: Nov. 1, 2011

(54) PROJECTION DISPLAY APPARATUS

(75) Inventor: Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 330 days.

(21) Appl. No.: 12/457,102

(22) Filed: Jun. 1, 2009

(65) Prior Publication Data

US 2010/0073638 A1 Mar. 25, 2010

(30) Foreign Application Priority Data

Sep. 23, 2008 (JP) ................................. 2008-243437

(51) Int. Cl.
*G02B 27/48* (2006.01)
(52) U.S. Cl. ......................................... 353/31; 359/707
(58) Field of Classification Search .................... 353/31, 353/38, 94; 359/707, 712, 623, 1, 196.1
See application file for complete search history.

(56) References Cited

U.S. PATENT DOCUMENTS

| | | | |
|---|---|---|---|
| 5,313,479 A | 5/1994 | Florence | |
| 7,746,559 B2 * | 6/2010 | Sharon et al. | 359/618 |
| 7,866,831 B2 * | 1/2011 | Kasazumi et al. | 353/98 |
| 7,944,598 B2 * | 5/2011 | Gollier | 359/279 |
| 7,954,962 B2 * | 6/2011 | Mizushima et al. | 353/94 |
| 2003/0123159 A1 | 7/2003 | Morita et al. | |

FOREIGN PATENT DOCUMENTS

| | | |
|---|---|---|
| JP | 6-208089 A | 7/1994 |
| JP | 2002-90881 A | 3/2002 |
| JP | 2002-267825 A | 9/2002 |
| JP | 2003-156710 A | 5/2003 |
| JP | 2003-262920 A | 9/2003 |

* cited by examiner

*Primary Examiner* — Seung C Sohn
(74) *Attorney, Agent, or Firm* — Birch, Stewart, Kolasch & Birch, LLP

(57) ABSTRACT

A projection display apparatus is provided that is capable of reducing speckle noise, with no image of a flaw or dust noticeable in or on a screen even if it exists in or on an optical component. The projection display apparatus includes a glass rod that makes uniform an optical beam emitted from a laser beam source; a lens that focuses an optical beam passing through the glass rod; a diffusion layer that provides an optical path difference distribution to the optical beam focused using the focusing element, the diffusion layer being optically conjugated with an incident end of the glass rod by the focusing element; a display device that spatially modulates the optical beam provided with the optical path difference distribution by the diffusion layer; and a magnification projection lens that projects on a screen an optical beam modulated by the modulator.

18 Claims, 12 Drawing Sheets

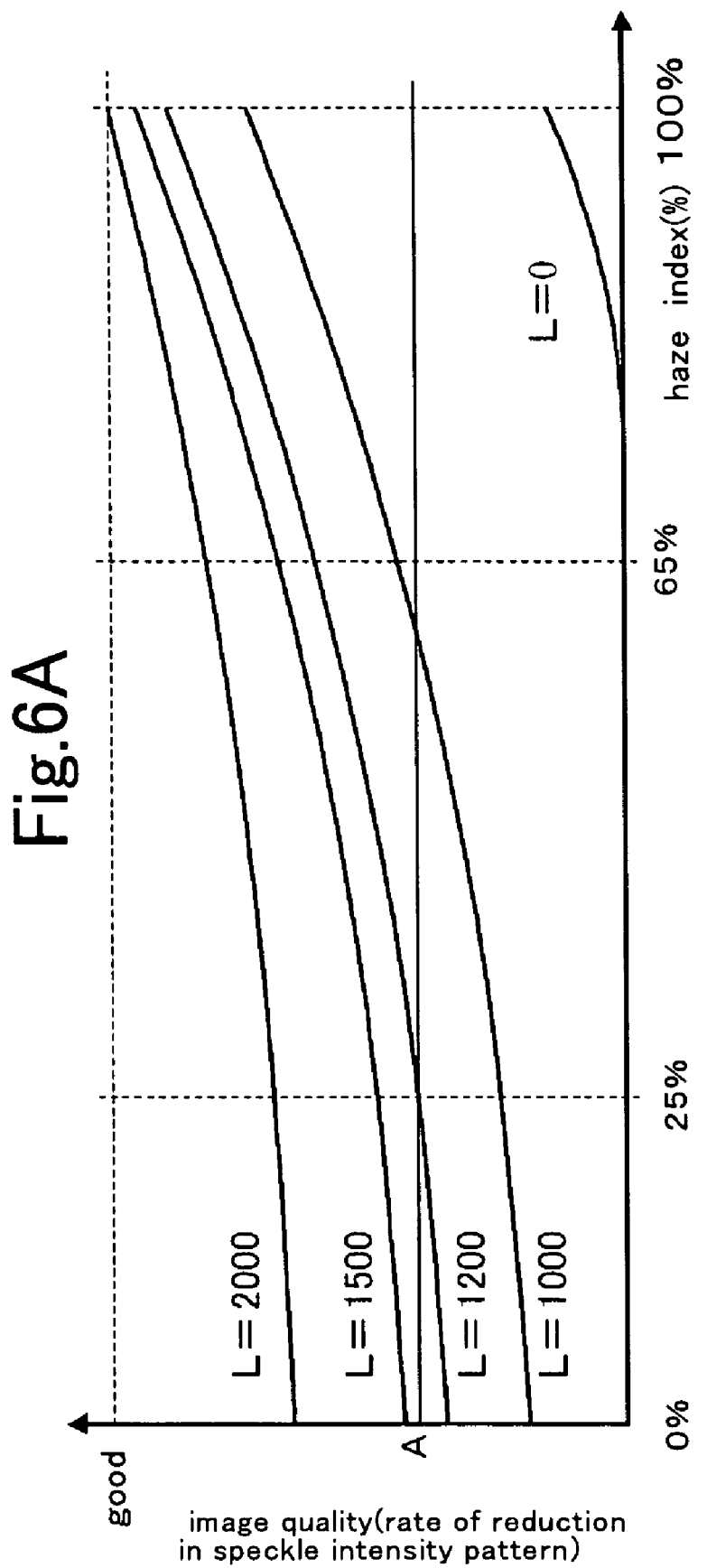

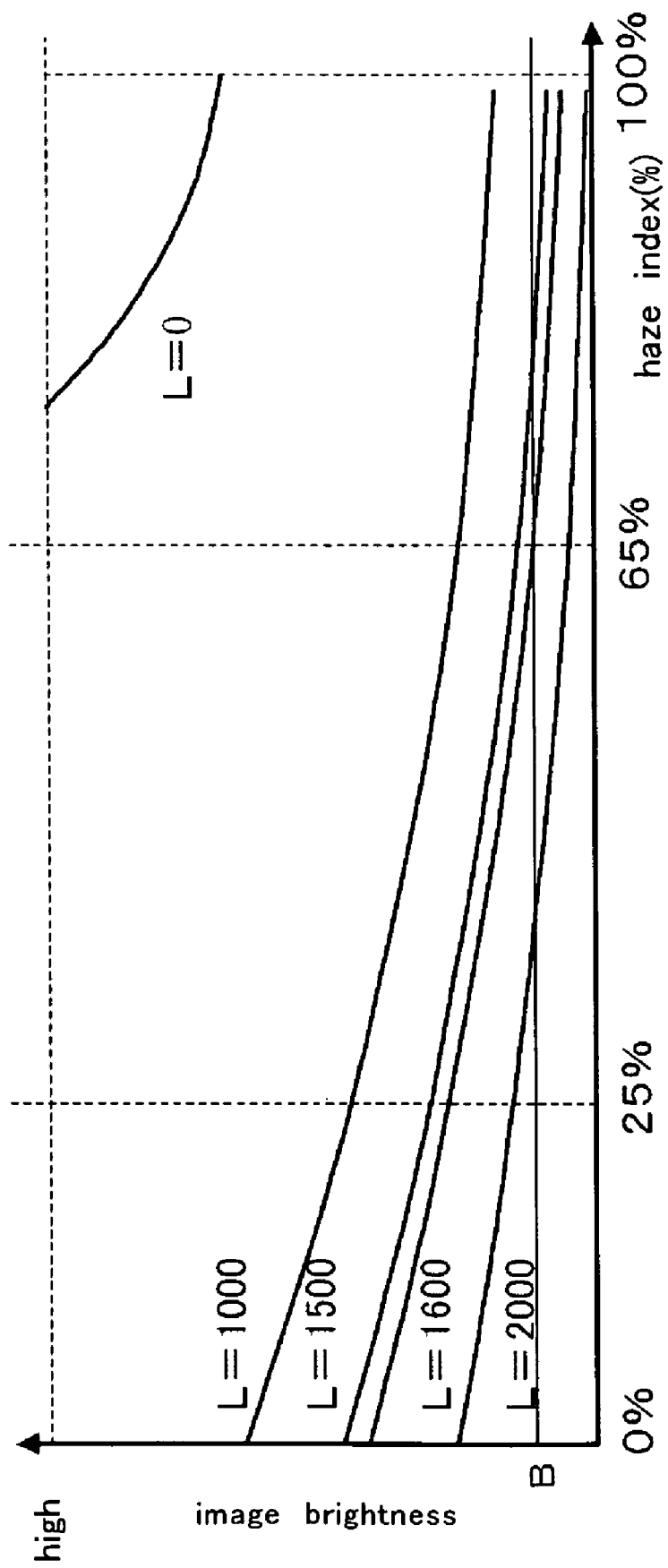

PROJECTION DISPLAY APPARATUS

FIELD OF THE INVENTION

The present invention relates to projection display apparatuses each having a function of speckle noise reduction, that produce high-quality images by reducing the speckle.

BACKGROUND OF THE INVENTION

Conventional projection display apparatuses represent images by conducting to a DMD (digital micro-mirror device)™ or an optical valve, an optical beam emitted from an optical source via optical elements such as lenses and mirrors and then projecting an output imaging beam on a screen. In such conventional display apparatuses, the above-described optical element provides an optical path difference to the optical beam, which leads to mutual interference between optical beams, thereby causing speckle (or speckle noise) to occur. Thus, in order to reduce occurrence of the speckle, an optical component causing a slight optical path difference is arranged to be placed in an optical path. Furthermore, in order to effectively reduce the occurrence of the speckle, a drive unit causes rotation of optical components placed, as is disclosed in Japanese Unexamined Patent Publication No. 2002-90881, thereby generating various speckle noise patterns and then reducing the speckle noise by visually averaging the patterns.

However, as shown in Japanese Unexamined Patent Publication No. 2002-90881, a problem is that when a flaw exists in or dust on the optical component for an apparatus having an optical component causing an optical path difference simply disposed in an optical path, the image of the flaw or dust is projected on the screen, thus resulting in an image defect on the screen, which leads to a reduction in image quality.

SUMMARY OF THE INVENTION

The present invention is directed to overcome the foregoing problems, and an object thereof is to provide a projection display apparatus capable of reducing speckle noise, without the image of a flaw or dust noticeable on the screen even if it exists in or on an optical component.

A projection display apparatus comprises an optical source; a mixing element that makes uniform an optical beam emitted from the optical source; an optical focusing element that focuses an optical beam passing through the mixing element; an optical path difference generating element that provides an optical path difference distribution to the optical beam focused using the focusing element, the optical path difference generating element being optically conjugated with an incident end of the mixing element by the focusing element; a modulator that spatially modulates the optical beam provided with the optical path difference distribution; and a projection unit that projects on a screen an optical beam modulated by the modulator A projection display apparatus further comprises an optical source; a mixing element that makes uniform an optical beam emitted from the optical source; an optical focusing element that focuses an optical beam passing through the mixing element; a modulator that spatially modulates the optical beam focused using the optical focusing element; a projection unit that projects on a screen an optical beam image modulated by the modulator; and an optical path difference generating element that provides an optical path difference distribution to an incident optical beam, the optical path difference generating element being disposed on an incident end of the mixing element or on an emitting end of the projection unit.

According to the invention, the speckle noise can be reduced with no image of a flaw or dust noticeable on a screen even if it exists in or on an optical path difference generating element.

BRIEF DESCRIPTION OF THE INVENTION

FIGS. 6A and 6B are graphs each illustrating, with optical fiber lengths as a parameter, relationships between haze indexes and image quality and between the indexes and image brightness according to Embodiment 1 of the present invention;

DESCRIPTION OF THE PREFERRED EMBODIMENTS

Embodiment 1

Figure 1:
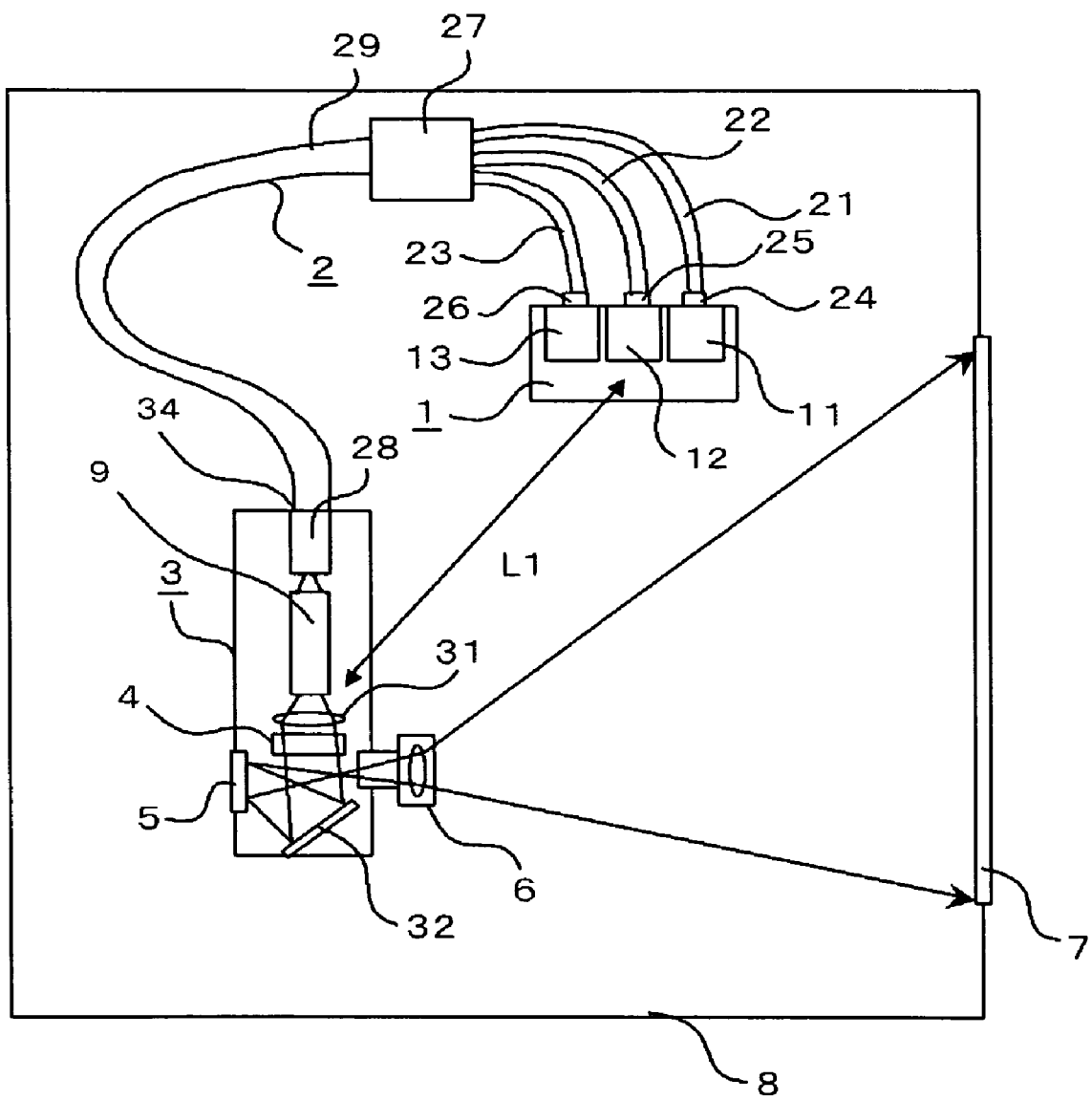
FIG. 1 is a view illustrating a configuration of a projection display apparatus according to Embodiment 1 of the present invention.
Figure 2:
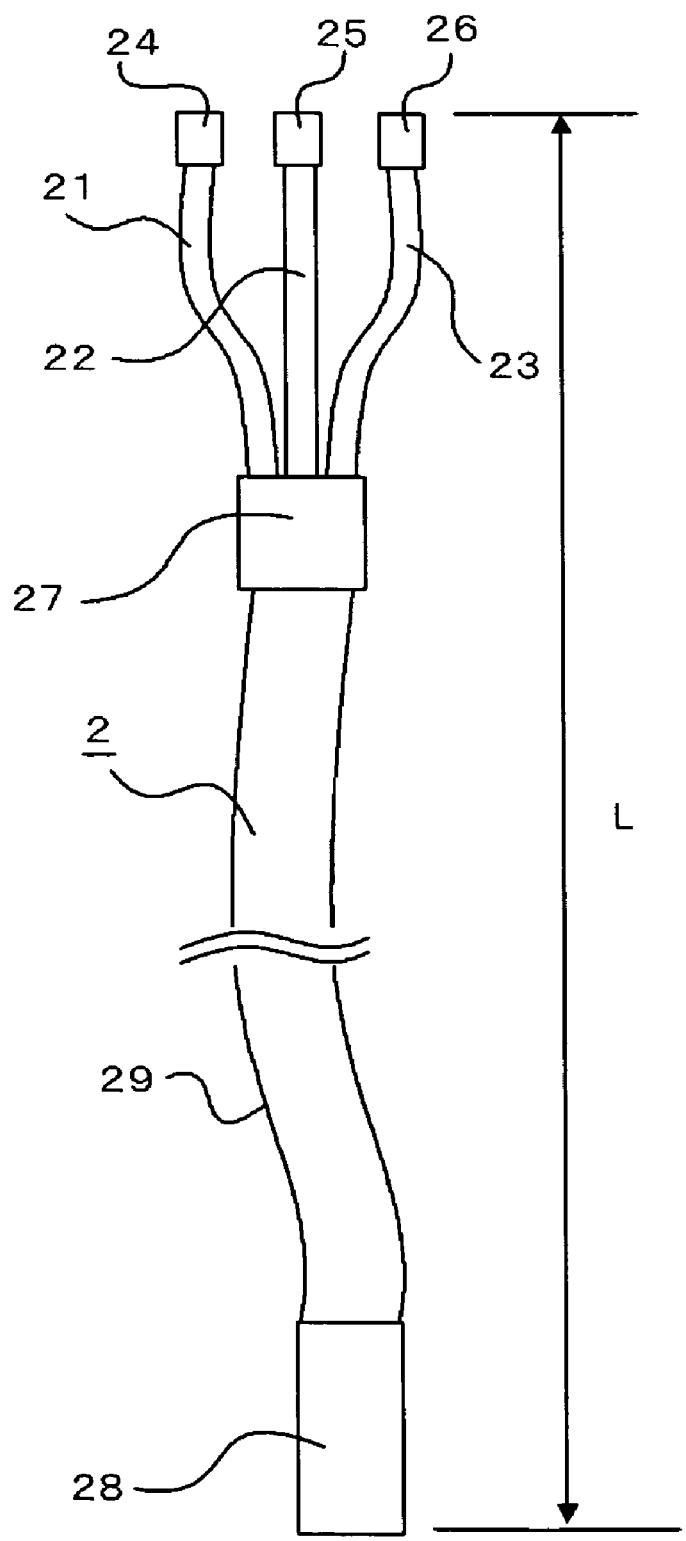
FIG. 2 is a view illustrating a configuration of an optical fiber group according to Embodiment 1 of the present invention.

FIG. 1 is a view illustrating a configuration of a projection display apparatus according to Embodiment 1 of the present invention, while FIG. 2 is that of an optical fiber group 2 according to Embodiment 1 thereof. The projection display apparatus, as shown in FIG. 1, is configured with a laser beam source 1, an optical fiber group 2, an optical engine 3, a magnification projection lens 6, and a screen 7, and a casing 8 housing them.

The laser beam source 1 includes a laser source unit 11 for emitting a green laser beam, a laser source unit 12 for emitting a red laser beam, a laser source unit 13 for emitting a blue laser beam, and a drive control circuit (not shown) for driving the laser source units 11-13. The laser beam source emits, based upon image signals produced from an image signal generation circuit (not shown), the green, red, or blue laser beam for each several milli-seconds so that the emission times of the optical beam from the laser source units 11-13 do not coincide.

The optical fiber group 2 includes optical fibers 21-23, a binder 27, and a coating 29. Incident end connectors 24-26 are fitted to first ends of the optical fibers 21-23, respectively; an emitting bundle member 28 is fitted to second ends of the fibers that are formed into a bundled emitting end. The incident end connectors 24-26 connect with the laser source unit 11-13, respectively. The optical fiber 21 transmits the green laser beam; the optical fiber 22, the red laser beam; and the optical fiber 23, the blue laser beam. The binder 27 bundles the optical fibers 21-23 together. The optical fibers 21-23, after bundled, are surrounded with the coating 29, and then installed inside a casing 8 as a single piece of cable. An emitting bundle member 28 is formed by holding the optical fibers 21-23 together using an adhesive or a clamp; a green, red or blue laser beam is emitted from the corresponding fiber of the emitting bundle member 28, in response to an output beam from the laser source 1.

The optical fibers 21-23 each are constituted by a core made of synthetic quartz, and a clad layer from fluoride resin. The diameter of the core of the optical fiber 21 transmitting the red laser beam is approximately 1,000 microns, and the core diameters of the optical fibers 21, 22 transmitting the green and blue laser beams, respectively, are approximately 400 microns. Further, each of the clad layers has a thickness of approximately 80 microns. The optical fibers 21-23 each provide two dimensional distribution of the optical path difference to the corresponding laser beam transmitting therethrough.

Because the laser beam, emitted from the laser beam source 1, spatially generate a variety of speckle noise patterns while transmitting through the optical fiber group 2, the images formed on the screen 7 are visually averaged, with the speckle noise being reduced. The extent of the reduction of the speckle noise has a relationship with the length of the optical fiber group 2 (optical fibers 21-23); the longer its length, the more the effect in reduction. However, when a too long optical fiber group is employed, its optical beam transmission efficiency and optical beam efficiency decrease, thereby resulting in dimmed images on the screen 7.

Here, the length L of the optical fiber group 2—from each of the incident end connectors 24-26 to the emitting bundle member 28—is set to be sufficiently longer than the straight distance L from the laser beam source 1 to the optical engine 3, and when installed inside the casing 8, the optical fiber group 2 is disposed along a gentle curve or an arc. Further, a radius of a curve formed by a fiber portion from the binder 27 to the emitting bundle member is set to be on the order of 12% through 25% of the diagonal dimension of the screen 7.

The optical engine 3 is constituted by a connector 34, a glass rod 9, a lens 31, a rotation optical device 4 inclusive of a diffusion layer 43, a reflective mirror 32, and a display device 5. The emitting bundle member 28 is secured to the connector 34, and the green, red and blue laser beams emitted from the fibers of the emitting bundle member 28 secured to the connector 34 are transmitted through the glass rod 9 to the lens 31.

The glass rod 9, which is constituted by a glass prism with high transmission, reflects the laser beam by the boundary surface between the glass portion and air, to then make uniform an intensity distribution of the laser beam transmitted from the optical fiber group 2. The lens 31 focuses the laser beam emitted from the fibers of the emitting bundle member 28, and the rotation optical device 4 diffuses the laser beam focused by the lens 31. The reflective mirror 32 reflects the laser beam diffused by the rotation optical device 4, to then shine the reflected optical beam onto the display device 5. The display device 5 spatially modulates the shone laser beam, based upon image output signals produced from an image signal generation circuit, not shown. The DMD or the like is used for the display device 5. The magnification projection lens 6 magnifies and projects to the screen 7 of large size the laser beam spatially modulated by the display device 5, and then, images corresponding to the image signals are displayed on the screen 7.

In the projection display apparatus shown in FIG. 1, the laser beam emitted from the laser beam source 1 are sent, via the optical fiber group 2 serving as a laser transmission optical path, to the glass rod 9 (mixing element) disposed inside the optical engine 3, and are then made uniform through the rod 9. The uniform laser beam is focused by the lens 31 (optical focusing element), pass through the rotation optical device 4 inclusive of the diffusion layer 43 (optical path difference generating element), and then shone on the display device 5. Here, the diffusion layer 43 is optically conjugated with the incident end of the glass rod 9 by the lens 31, thus generating an optical path difference on a laser beam having passed therethrough. The laser beam having passed through the diffusion layer 43 is magnified and projected, through the magnification projection lens 6, on the screen 7 having a large size provided to the casing 8.

Figure 3:
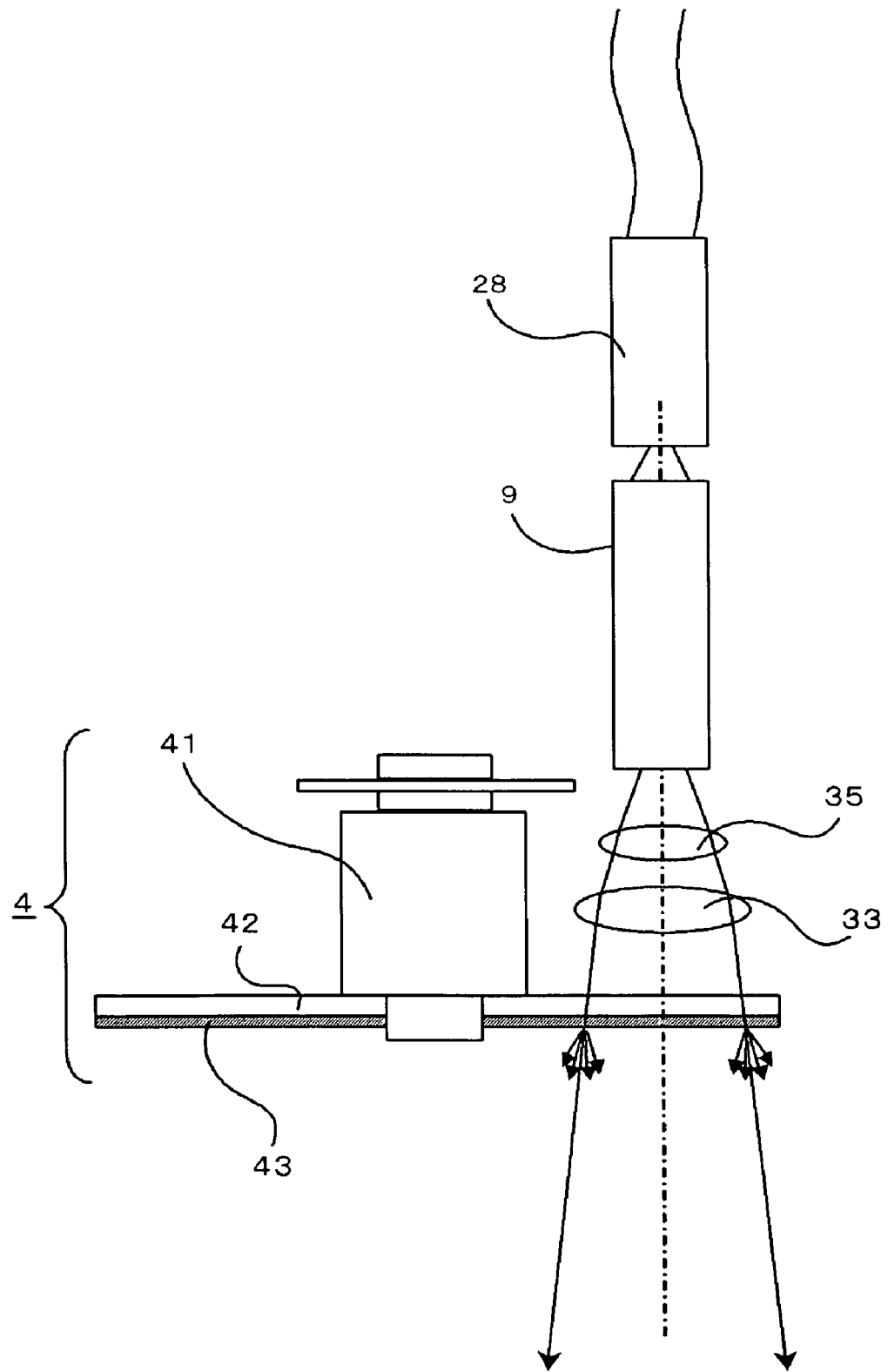
FIG. 3 is a view illustrating a configuration of a rotation optical device according to Embodiment 1 of the present invention.

FIG. 3 is a view illustrating an example configuration and the diffusion action of the rotation optical device 4 according to Embodiment 1 of the present invention. In FIG. 3, the connector 34 for securing the emitting bundle member 28 thereto is not illustrated, and the lens 31 is represented as individual lenses 33, 35. As shown in FIG. 3, the rotation optical device 4 is constituted by a motor 41, a plane substrate 42 and the diffusion layer 43. The motor 41, which is powered from a power supply unit, not shown, rotates the plane substrate 42 at a predetermined revolution speed. The plane substrate 42, which is a disc-shaped plane substrate having a circular opening provided in the center thereof, is mounted through the circular opening to the drive shaft of the motor 41 so that the rotation axis of the motor 41 is substantially in parallel with the normal of the plane substrate 42. The plane substrate 42 is made from transparent resin; thus, the whole laser beam, emitted from the fibers of the emitting bundle member 28 and then focused by the lenses 33, 35, passes through the plane substrate 42 as it is. The radius of the disc of the plane substrate 42 is made larger than the spot size of passing laser beam. The diffusion layer 43, which is provided to the optical beam emitting side of the plane substrate 42, is made by application of resin. Because diffusion particles contained in the resin have a characteristic of scattering an optical beam, the laser beam is slightly scattered in the diffusion layer 43. The scattered laser beam is directed to the reflective mirror 32, as shown in FIG. 1, located downstream of the optical engine. Because the diffusion layer 43 of the rotation optical device 4 temporally generate various speckle noise patterns from the laser beam, the speckle noise is reduced by visual averaging. Here, the revolution speed of the motor 41 is set to 900 rpm through 7200 rpm. The speed may be and is preferably set to 3600 rpm through 4000 rpm, in consideration of its life-span and noise level.

The diffusion layer 43 is configured to be optically conjugated with the incident end of the glass rod 9 serving as the mixing element by the lens 31. A plane that is optically conjugated with the incident end of the rod signifies a plane or its neighborhood on which an image present on the incident end of the mixing element is focused through this element by the optical focusing element. The plane optically conjugated with the incident end, mentioned herein, refers to a plane sufficiently apart from a focus depth range of the focus plane, and also within a range in which an image of a flaw or dust on the diffusion layer 43 are not projected on the screen 7—e.g., a plane within a distance approximately five millimeters apart from the focus plane. For instance, with the projection display apparatus as shown in FIG. 1, the optically conjugated plane exists between the lens 31 and the mirror 32. Further, with another apparatus where an optical beam from the optical focusing element 31 directly enter the display device 5 without being reflected by a mirror or the like, the above-described optically conjugated plane exists between the focusing element 31 and the display device 5.

Figure 4:
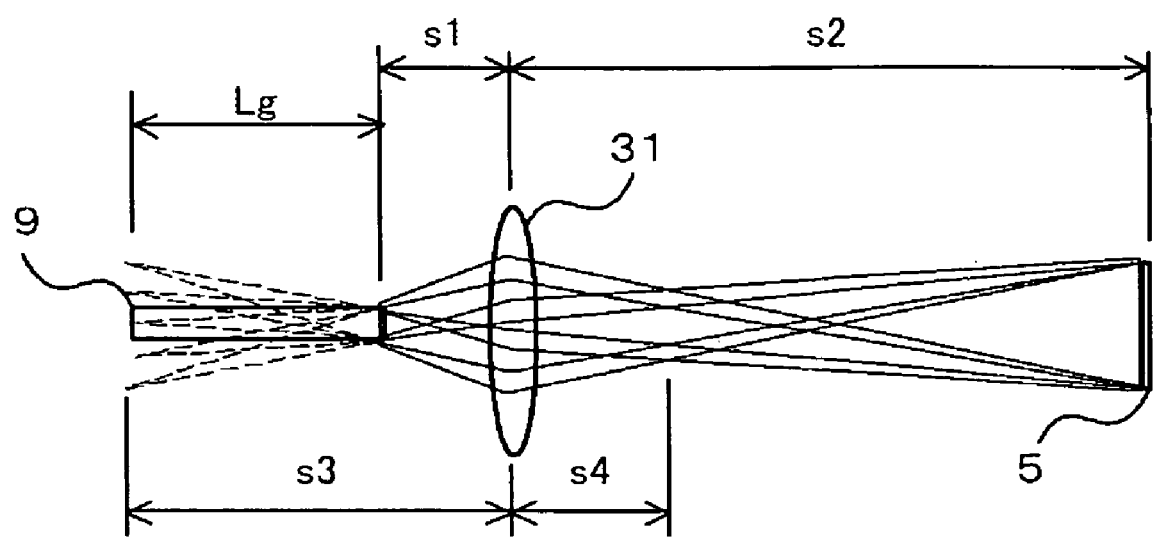
FIG. 4 is a view illustrating a relationship between focusing images according to Embodiment 1 of the present invention.

A method of determining the focus plane will be described below referring to FIG. 4, which is a diagrammatic view illustrating a focusing relationship between the glass rod 9, the lens 31, and the display device 5. Given that the distance from the emitting end of the glass rod 9 to the center plane of the lens 31 is designated as s1; the distance from the center of the lens 31 to the display device 5, as s2; and the resultant focal length of the lens 31, as f, then because of these parameters being in the relationship as shown by Equation 1, when the design of the lens 31 determines the parameters f, s1 and s2, the positional relationship between the lens 31 and the glass rod 9 is determined.

$$1/s1+1/s2=1/f \qquad \text{Equation 1}$$

Further, the distance s3 from the incident end of the glass rod 9 to the center of the lens 31, the distance s4 from the lens 31 to the focus plane on which an image on the incident end of the glass rod 9 is focused, and the resultant focal length f of lens 31, satisfy the relationship as shown by Equation 2. Thus, if the length Lg of the glass rod 9 is determined after the positional relationship between the lens 31 and the glass rod 9 has been determined, then, the distance s4 can be derived.

$$1/s3+1/s4=1/f \qquad \text{Equation 2}$$

In this way, the design of the lens 31 determines the parameters f, s1, s2 and the length Lg of the glass rod 9 to thereby lead to determination of s4, whereby the focus plane on which an image on the incident end of the glass rod 9 is focused by the lens 31 can be calculated. Thus, this focus plane and its neighborhood can be determined to be the above-described optically conjugated plane.

Assuming that the diffusion layer 43 is disposed in the neighborhood of the display device 5, the image of the diffusion layer 43 is clearly projected on the screen 7; as a result, an image of a flaw or dust, if present on the diffusion layer 43, also appears clearly on the screen. In contrast, assuming that the diffusion layer 43 is located sufficiently apart from the display device 5 and optically conjugated with the incident end of the glass rod 9, any image of an objective on an optically conjugated plane is not focused on the display device 5. For that reason, even if there exists a flaw or dust on the diffusion layer 43, its image will not be projected on the screen, thus allowing the speckle noise to be reduced.

Figure 5:
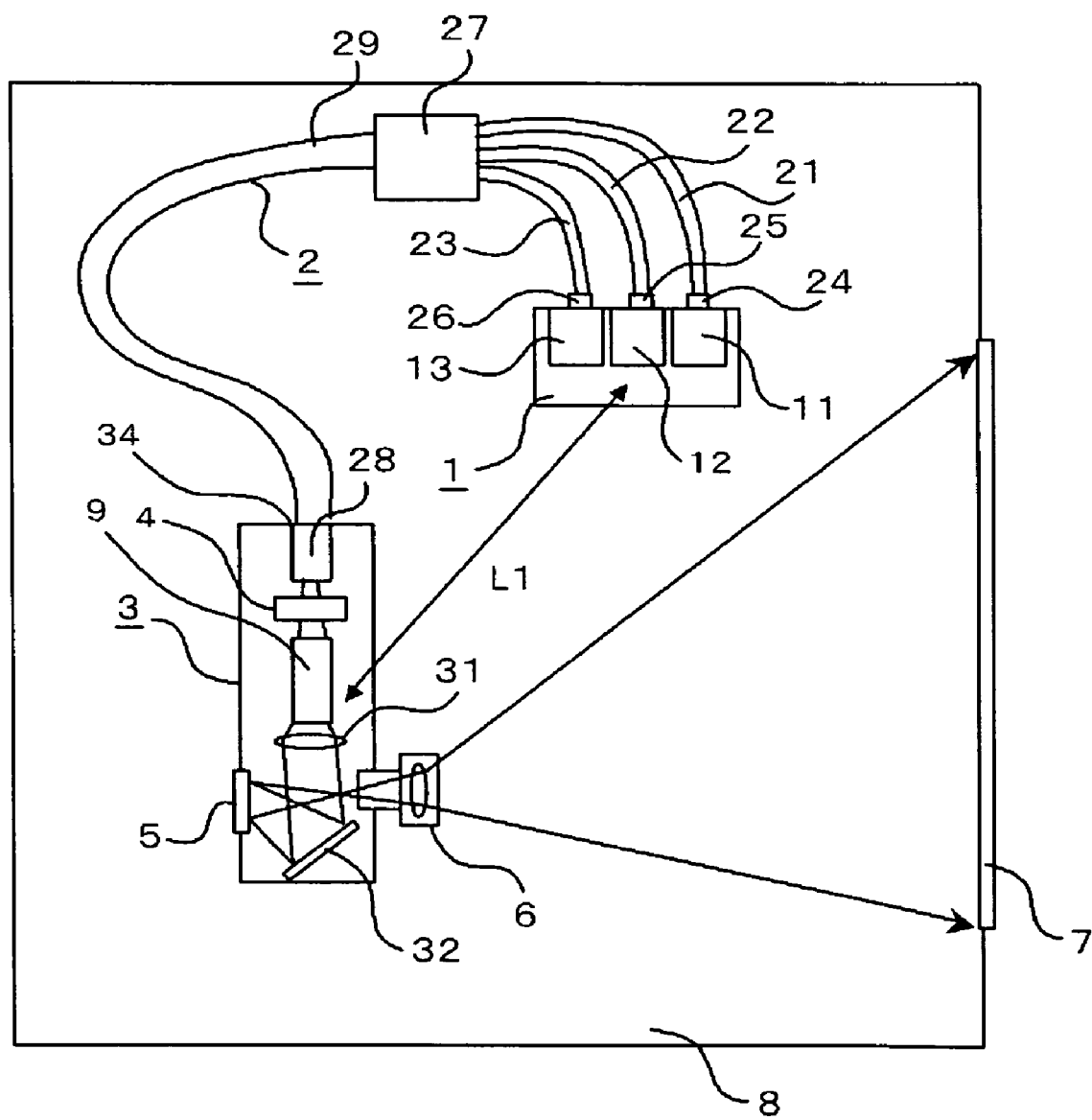
FIG. 5 is a view illustrating a configuration of a projection display apparatus according to another example of Embodiment 1 of the present invention.

Here, in the foregoing case, the rotation optical device 4 is arranged so that the diffusion layer 43 is optically conjugated with the incident end of the glass rod 9 by the lens 31. As another example, even if the diffusion layer 43 of the rotation optical device 4 is disposed, as shown in FIG. 5, at the incident end of the glass rod 9, or at the emitting end of the projection lens 6, the image of the diffusion layer 43 is not projected on the screen, thus enabling the speckle noise to be reduced. However, in situations where the diffusion layer 43 is disposed at the incident end of the glass rod 9, the diffusion layer 43 tends to be overheated. As a result, when the diffusion layer 43 is disposed at the emitting end of the projection lens 6, the diffusion layer 43 and the plane substrate 42 having the diffusion layers 43 thereon turn out to be of large size. In contrast, when located on the optically conjugated plane as shown in FIG. 4, the diffusion layer 43 is not overheated, nor is there the need of large size; thus, a compact apparatus with excellent thermal performance can be provided. Note that the incident end of the glass rod 9 signifies the neighborhood of the incident end where an optical beam enter the glass rod 9, referring to a range sufficiently spaced apart from a focus depth range of the incident end, and also to the range within which the images of a flaw or dust on the diffusion layer 43 are not projected on the screen 7 and also the diffusion layer 43 does not contact the incident end—e.g., a plane within a distance approximately five millimeters apart from the incident end thereof. Note again that the emitting end of the projection lens 6 signifies the neighborhood of the emitting end where an optical beam emits from projection lens 6, referring to a position sufficiently spaced apart from a focus depth range of the emitting end, and also to the range within which the images of a flaw or dust on the diffusion layer 43 are not projected on the screen 7—e.g., a plane within a distance approximately five millimeters apart from the emitting end thereof.

Next, using the length of the optical fiber group 2 as a parameter, relationships of the haze index of the diffusion layer 43 versus image quality and image brightness will be described below. Because a laser beam, emitted from each of the laser beam source units 11-13, spatially generates a variety of speckle patterns while passing through the optical fiber group 2 installed as bent, the speckle noise can be reduced by visually averaging images formed on the screen. The extent of the reduction of the speckle noise has a relationship with each length of the optical fiber group 2; the longer the length, the more the effect in reduction. However, when the optical fiber group 2 is too long, installation difficulty in that the fiber group 2 needs to be coiled into a bundle and fastened in place is very likely to arise; furthermore, making the length longer is undesirable in terms of the optical beam efficiency because the transmission efficiency of the fiber group decreases.

FIG. 6A shows graphs illustrating the relationship between the haze index of the diffusion layer 43 of the rotation optical device 4 and the quality of the image displayed on the screen 7, for each length L of the optical fiber group 2, while FIG. 6B shows graphs illustrating the relationship between the haze index of the diffusion layer 43 of the rotation optical device 4 and the brightness of the image displayed on the screen 7, for each length L of the optical fiber group 2. Here, the haze index is assumed to be a number obtained by dividing diffused optical beam transmittance by total optical beam transmittance, representing a ratio of a diffused optical beam in a transmitted optical beam. Here, the number of apertures (NA) of the optical fiber group 2 in FIGS. 6A, 6B is a value from 0.35 to 0.5, and an optical beam from the optical beam source 1 enters the fibers at a convergence angle from 20 to 30 degrees.

As shown in FIG. 6A, the more the haze index or the length of the optical fiber group 2 increases, the more the reduction index of speckle intensity pattern increases, with the image quality being improved. In FIG. 6A, a value A is a criterion value of the image quality. When the image quality is below the value A, speckle patterns are visually recognized on the screen 7. When the length L of the optical fiber group 2 is made shorter than 1.2 meters, the image quality is difficult to maintain above the criterion value. Thus, the length L of the optical fiber group 2 is set to 1.2 meters or more. At this time, with the haze index of 25% or more, images having more than predetermined quality level can be displayed on the screen 7.

Furthermore, as shown in FIG. 6B, as the haze index or the length L of the optical fiber group 2 increases, the transmission efficiency of the laser beam decreases, which thus reduces the image brightness as well. In FIG. 6B, a value B is a criterion value of the image brightness. When the image brightness is below the value B, the brightness level needed for enjoying images displayed on the screen 7 is not achievable. When the length L of the optical fiber group 2 is made longer than 1.6 meters, it becomes difficult to maintain the image brightness above the criterion value. Thus, the length L of the optical fiber group 2 is determined to 1.6 meters or less. At this time, with the haze index of 65% or less, images having more than predetermined image quality level can be displayed on the screen 7.

As described above, in the projection display apparatus according to Embodiment 1, the diffusion layer 43 is optically conjugated with the incident end of the glass rod 9 by the lens 31; thus, even if a flaw or dust exists in or on the diffusion layer 43, its image is not projected on the screen, thus allowing reduction of the speckle noise.

In addition, the diffusion layer 43 is disposed at the incident end portion of the glass rod 9, or the emitting end portion of the projection lens 6. For this reason, even if there exists a flaw or dust in or on the diffusion layer 43, the speckle noise can be reduced with no corresponding image projected onto the screen.

By rotating the diffusion layer 43 using the motor 41 and thereby varying a position of the diffusion layer 43 where an optical beam passes through, various speckle patterns are temporally generated and then visually averaged; as a result, the speckle noise can be reduced.

Furthermore, the connection of the laser beam source 1 with the optical engine 3 using the optical fiber group 2 considerably enhances the designer's freedom in their arrangement.

Since the diffusion layer 43, formed on the plane substrate 42, is used as means generating the optical path difference, optical path difference generating elements can be provided at lower cost.

Because the haze index of the diffusion layer 43 of the rotation optical device is set to be 25% through 65% and the length of the optical fiber group 2 to be 1.2 through 1.6 meters, bright and high-quality images can be displayed.

Still further, when, in extending the optical fiber group 2, the length of its run is too long, there arises a difficulty in installation where the fiber group 2 is coiled into a bundle and secured in place. However, the provision of the rotation optical device 4 to the apparatus allows the length of the fiber group 2 to be shortened, thus eliminating such a difficulty.

The desired result of reducing the speckle noise, as a whole, is achieved through a combination of both effects resulted from spatially differing speckle patterns produced through the optical fiber group 2 and from temporally differing speckle patterns produced through the diffusion layer 43. In comparison with the case where such an advantageous effect is achieved by only either of the above-mentioned effects, the designer's freedom is enhanced, thereby minimizing side effects such as reduction in optical beam efficiency and providing high-quality images while avoiding the increase of design burden in each means.

Yet further, by disposing the diffusion layer 43 in the neighborhood of an intermediate image plane within the optical engine 3, irregularities of a shining beam that is shone on the display device 5 can effectively be reduced as well. From this viewpoint, preferably, the diffusion layer 43 is disposed in the vicinity of the optical source image distribution pattern formed in the optical path inside the optical engine 3.

The optical fiber group 2 can be disposed, along a gentle arc, in the casing 8, as shown in FIG. 1. At this time, assuming that the radius of a curve formed by a fiber portion from the binding member 27 to the exist bundle member is on the order of 12% through 25% of the screen size of the projection display apparatus—i.e., the diagonal dimension of the screen 7—then, when disposed along a gentle arc in a rear space of the apparatus, the optical fiber group 2 can be installed without using a particularly heavy and complex fastener.

Although in the foregoing description, the laser beam emitted from three optical units are transmitted using three optical fibers, the laser beam emitted from four or more optical units may be transmitted by using four or more optical fibers.

Embodiment 2

Figure 7:
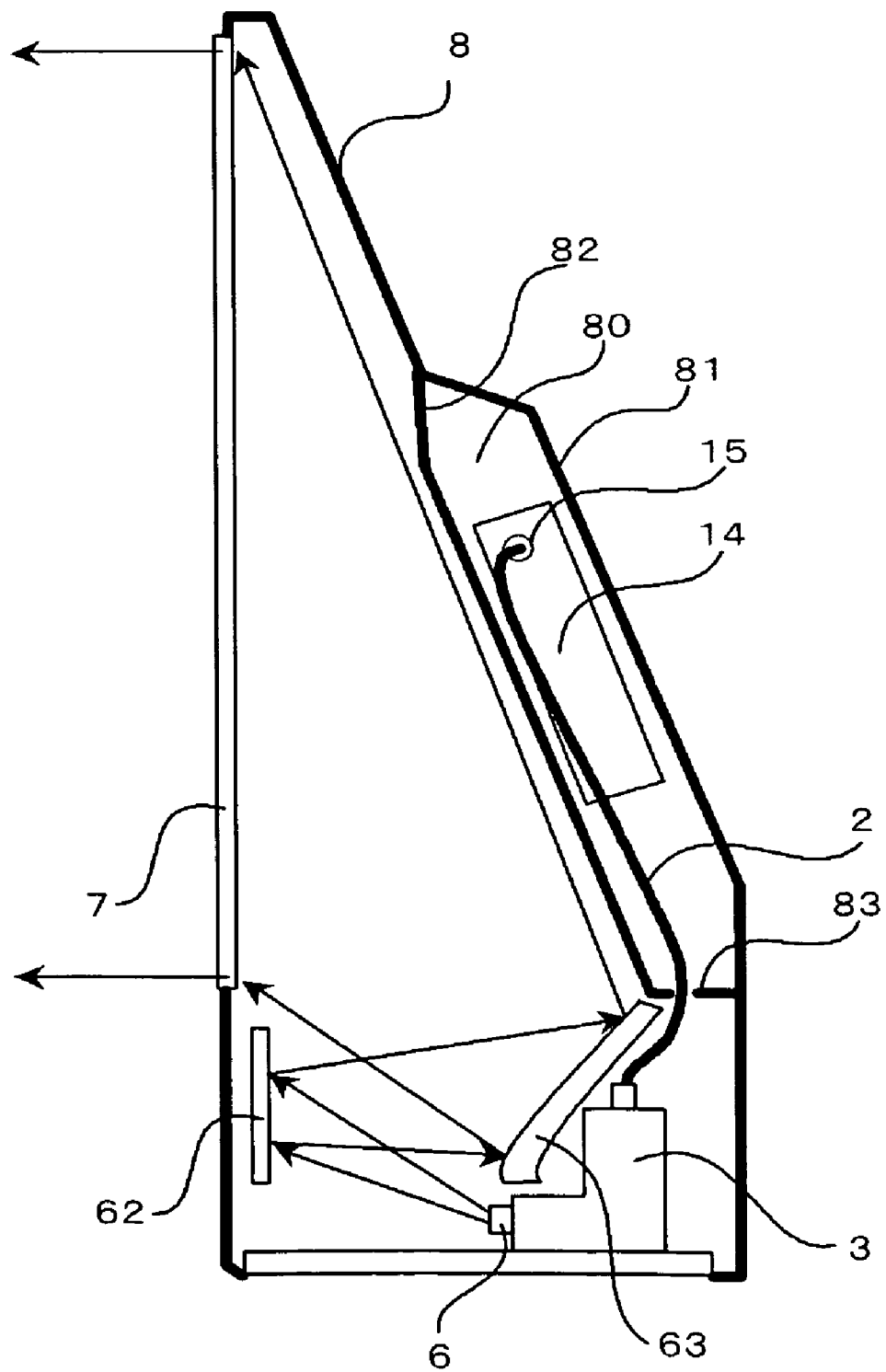
FIG. 7 is a cross-sectional view illustrating a projection display apparatus according to Embodiment 2 of the present invention.
Figure 8:
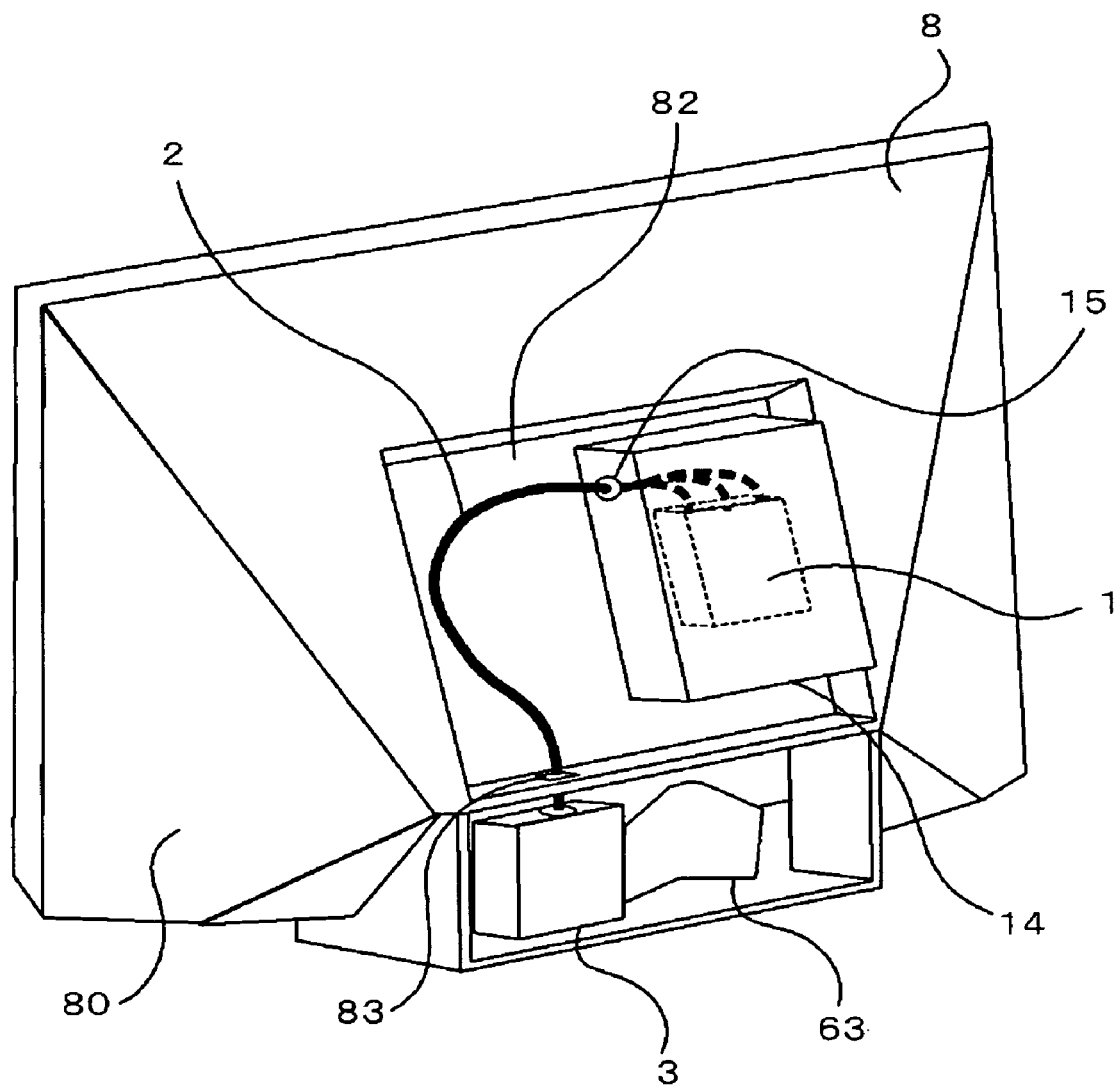
FIG. 8 is an exploded perspective view illustrating the projection display apparatus according to Embodiment 2 of the present invention.

FIG. 7 is a cross-sectional view illustrating the placement of major components provided inside a projection display apparatus according to Embodiment 2, and FIG. 8 is a rear perspective view illustrating the projection display apparatus according thereto. In FIGS. 7 and 8, the same reference numerals refer to elements that are the same as or similar to those illustrated in FIG. 1, and description on like elements will not be provided herein. Here, FIG. 8 shows the rear portion of the casing with an exterior rear cover 81 removed therefrom.

The casing has an aperture for mounting the screen 7 at its front side, and a compartment space 80 for housing the laser beam source 1 and the optical fiber group 2 at its rear portion. The compartment space 80 is configured by a recessed portion 82 formed by depressing the rear of the casing 8, and the exterior rear cover 81 for covering the recessed portion 82. An enclosure box 14, which houses the laser beam source 1 thereinside, is secured to the recessed portion 82 using unillustrated screws. The enclosure box 14 stays inside the compartment space 80 after installing the exterior rear cover 81 over the recessed portion 82. A side of the enclosure box 14 is formed with an opening 15 for leading out the optical fiber group 2 connected to the laser beam source 1.

The optical fiber group 2, after having been installed in the compartment space 80, is led out of the compartment space 80 through the opening 83 formed at the side of the recessed portion 82, and then connects to the optical engine 3. In this way, the laser beam source 1 and the optical engine 3, while connected together by means of the optical fiber group 2, are disposed vertically apart from each other. Note that although not shown in FIG. 8, another enclosure box containing an image signal generating element is disposed side by side with the enclosure box 14. The enclosure box is secured at a predetermined distance apart from the recessed portion 82 using screws (nor shown). The optical fiber group 2 drawn out from the enclosure box 14 reaches the opening 83 through between the unillustrated enclosure box and the recessed portion 82.

A plane mirror 62, which is disposed opposite the magnification projection lens 6, reflects back, as shown by arrows in FIG. 7, toward the rear of the casing the projection beam emitted from the magnification projection lens 6. An aspheric reflective mirror 63 reflects back again the projection beam reflected by the plane mirror 62, toward the screen 7. The aspheric reflective mirror 63, which is shaped as bulged outward at the center more than at the peripheral portion, reflects toward the screen 7 the entering projection beam as magnified, as shown by arrows in FIG. 7. The projection beam reflected by the aspheric reflective mirror 63 is provided, through the screen 70, as an image viewable within a predetermined viewing angle.

In this manner, by bending the optical path using the plane mirror 62 and the aspheric reflective mirror 63 and then by shifting the axis of incidence—i.e, by striking the projection optical beam on the screen 7 from the lower position—the depth of the casing 8 can be made small, thus achieving thinness in casing structure. Further, because of the optical engine 3 being located substantially in the neighborhood of the bottom of the apparatus, the height of the lower portion of the screen 7, i.e., the pedestal, can be made small, thus ensuring the advantage in appearance design. Furthermore, the laser beam source 1 is disposed within the exterior rear cover 81—i.e., in the compartment space 80 provided in the rear portion of the casing 8, the depth of the casing can be made small.

Figure 9:
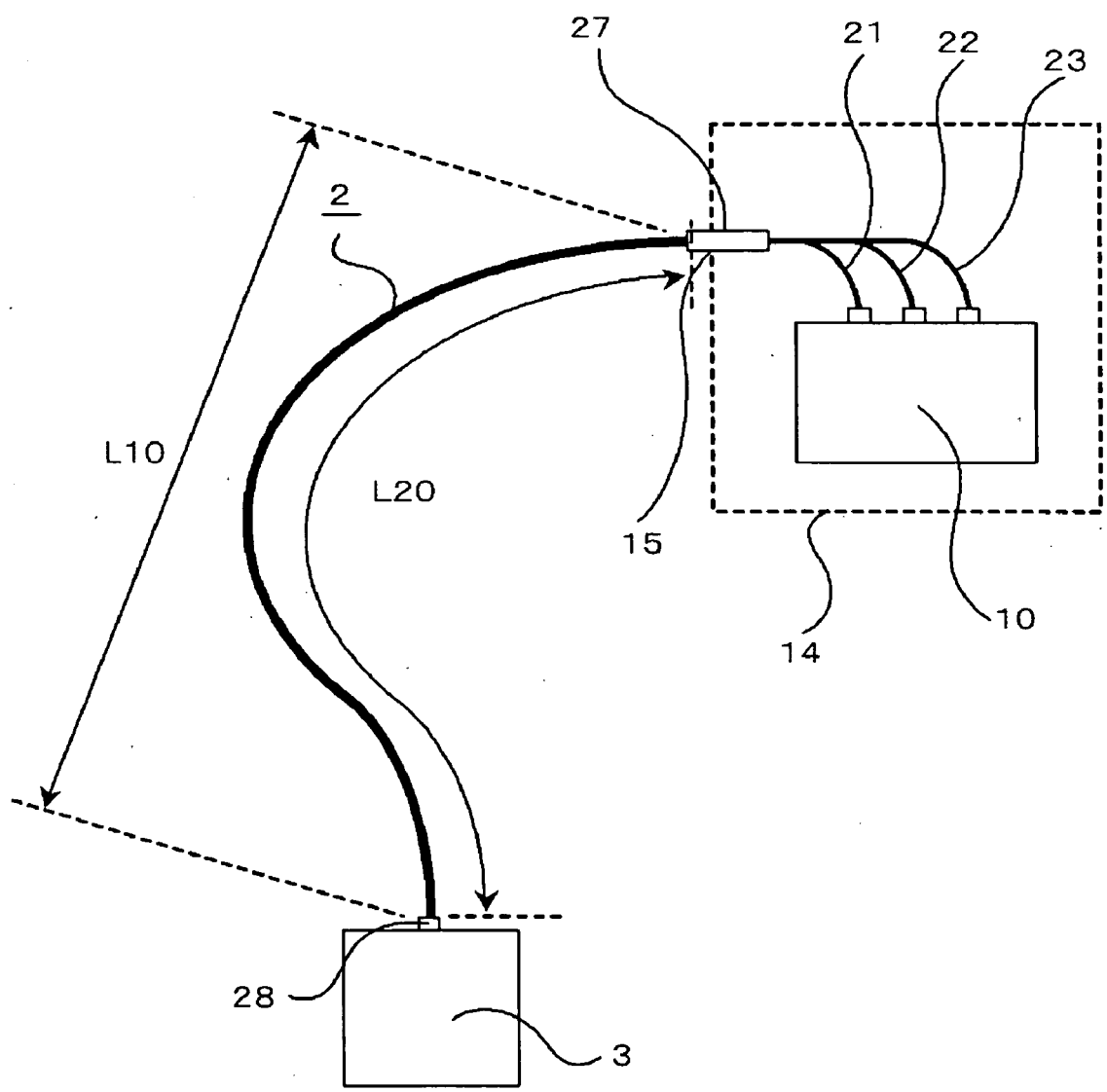
FIG. 9 is a diagrammatical view illustrating interconnections between an optical fiber group according to Embodiment 2 of the present invention.

Further, the enclosure box 14 and the optical engine 3 are disposed so that an orientation along which the optical fiber group 2 is drawn out from the enclosure box 14 may not be in parallel with that along which the optical fiber group 2 is connected to the optical engine 3, whereby undesirable mechanical stress can be avoided that is imposed on the fiber group 2 connecting the box 14 with the engine 3, when a sharp bending force is applied to the group 2. And yet, because the length of the optical fiber 2 is ensured to be more than a given length, the effect on reduction of the speckle noise is easily obtained. Specifically, as shown in FIG. 9, assuming that the straight distance from the binder 27 to the end portion 28 of the optical fiber group 2 is designated as L10 and the distance from the binder 27 of the optical fiber group 2 to its end portion 28, as L20, and if 2.4×L10>L20>1.2×L10, then the speckle reduction is made effective.

Further, the binder 27 is disposed so as to pass through the opening 15 of the enclosure box 14. In this way, if the binder 27 is made to pass through a through-opening in the enclosure box 14, then, even in a comparatively narrow space, bending radii of the respective optical fibers can be made small inside the enclosure box 14 because each of the optical fibers 21-23 is a single core cord, thus resulting in the installation being easy. Further, since the optical fibers 21-23 are bundled together into a single fiber optic cable outside the enclosure box 14, clamp means or the like that is used to define a wiring pattern is also easy to design.

Embodiment 3

Figure 10:
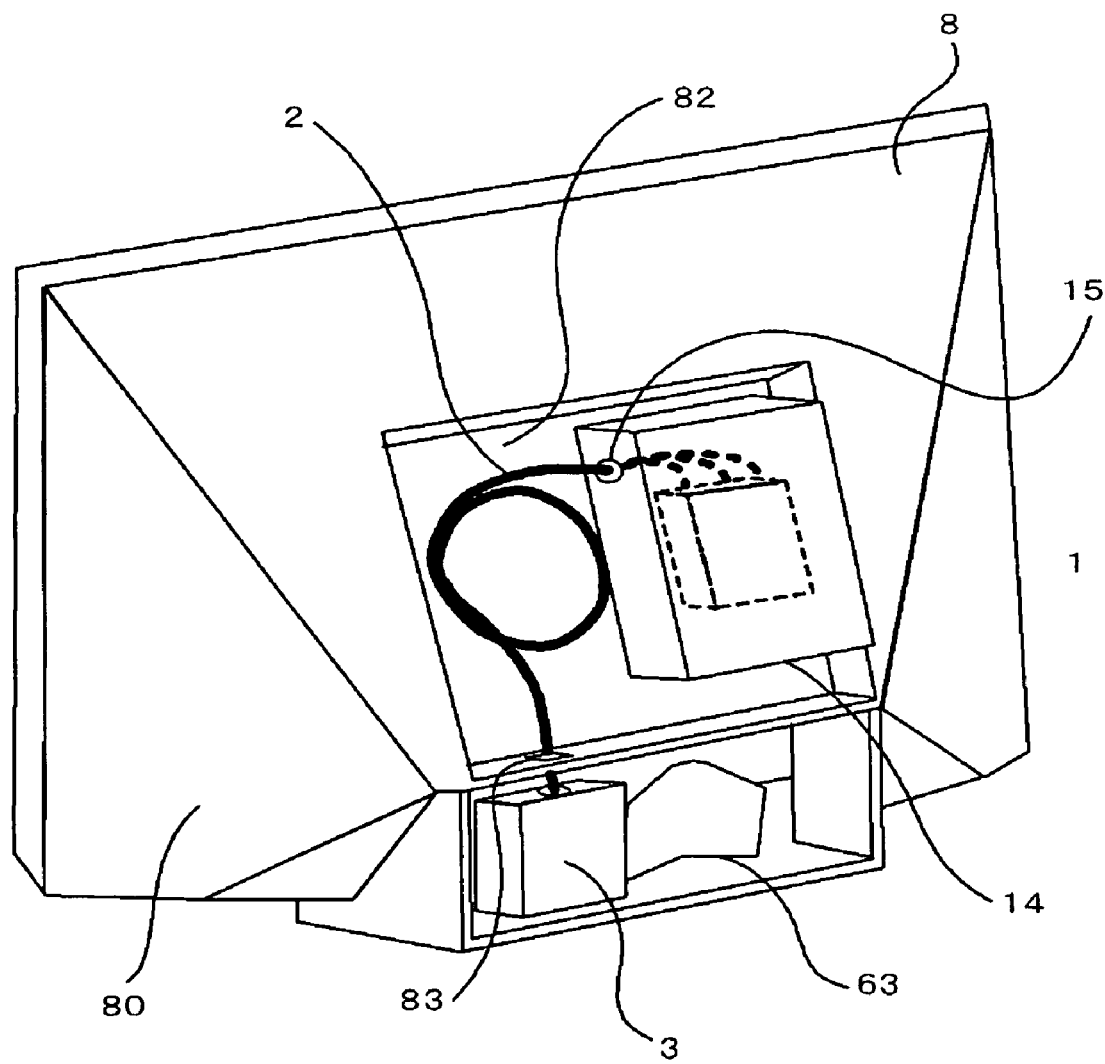
FIG. 10 is an exploded perspective view illustrating a projection display apparatus according to Embodiment 3 of the present invention.

FIG. 10 is a rear perspective view of a projection display apparatus according to Embodiment 3. In FIG. 10, the same reference numerals refer to elements that are the same as or similar to those illustrated in FIG. 8, and description on like elements will not be provided herein. Referring to FIG. 10, by circularly bundling and then installing the optical fiber group 2, the length of the optical fiber group 2 can be extended, thereby achieving a more effect on speckle noise reduction. Moreover, a sufficient effect on speckle noise reduction can also be achieved for the installation of the fiber group 2 in a situation where the enclosure box 14 and the optical engine 3 are hard to place apart from each other, and also for its installation inside the projection display apparatus with a small screen size.

Embodiment 4

Figure 11:
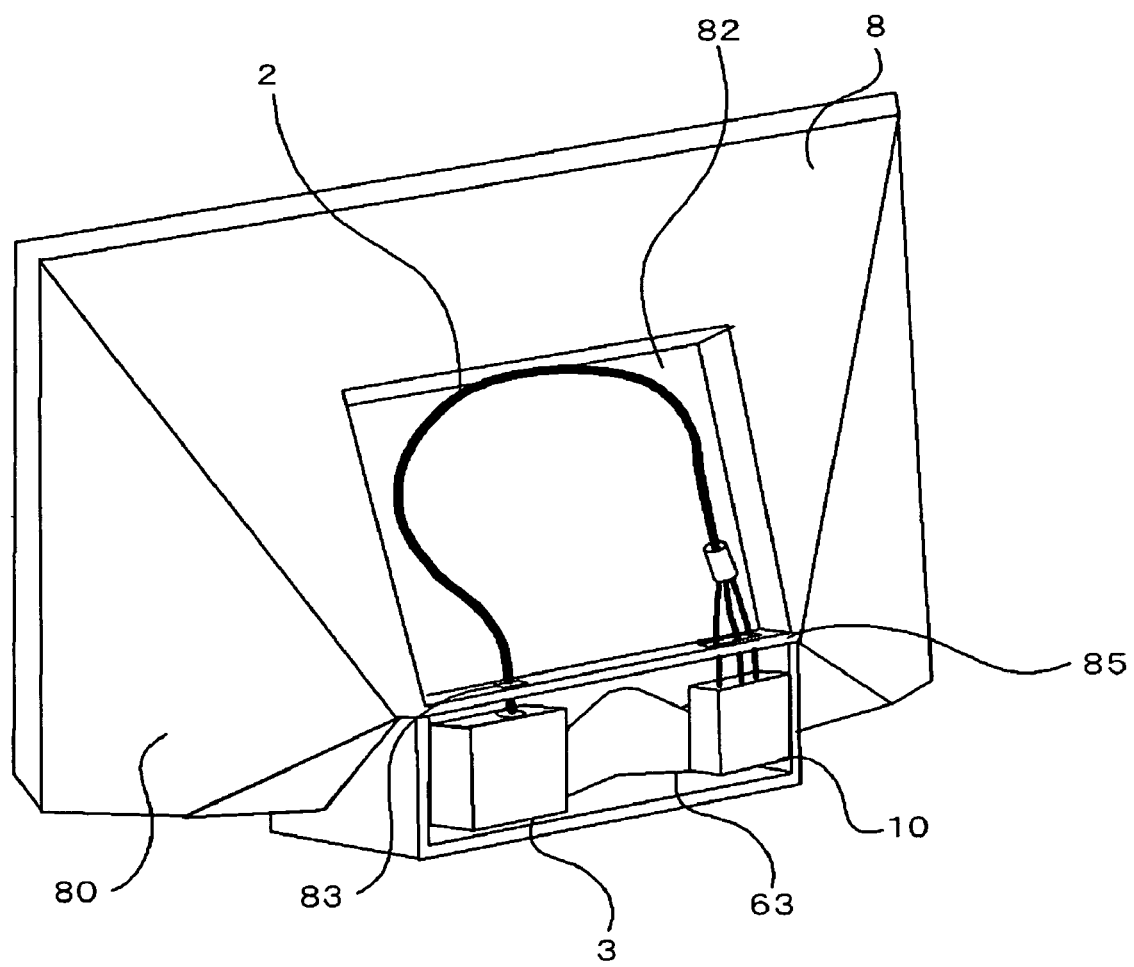
FIG. 11 is an exploded perspective view illustrating a projection display apparatus according to Embodiment 4 of the present invention.

FIG. 11 is a rear perspective view of a projection display apparatus according to Embodiment 4. In FIG. 11, the same reference numerals refer to elements that are the same as or similar to those illustrated in FIG. 8, and description on like elements will not be provided herein. Referring to FIG. 11, the laser beam source 10 is disposed in the vicinity of a position as high as the optical engine 3, and opposite the optical engine 3 with the aspheric reflective mirror 63 interposed therebetween. The recessed portion 82 is formed with the opening 85, through which the optical fibers 21 through 23 connected to the laser beam source 10 run in the compartment space 80. After bending at a predetermined radius of curvature in the space 80, the optical fibers run out of there through the opening 83, to then connect to the optical engine 3. Such an arrangement allows the compartment space 80 located in the rear portion of the casing 8 to be formed thin, thus enabling the projection display apparatus to be further downsized.

Here, although in the foregoing description the openings 83, 85 are assumed to be provided independently, a single opening can also be provided that serves as the two openings.

In the preceding description, the optical fiber group 2 bends at the predetermined radius of curvature in the compartment space 80; however, by circularly bundling and then installing the group 2, a more effect on speckle noise reduction can be achieved. Further, a sufficient effect on speckle noise reduction can also be achieved for the installation of the fiber group 2 in a case where the enclosure box 14 and the optical engine 3 are difficult to dispose apart from each other, and also for its installation inside the projection display apparatus with a small screen size.

In the foregoing description, the opening 15 is assumed to be provided to the one side of the enclosure box 14; however, it may be provided to another side thereof.

The preceding description shows that the opening 83 is assumed to be provided to the bottom of the recessed portion 82; however, it may be provided to another side thereof.

In the previous discussion, the description on the optical path difference generating element using the diffusion layer 43 is made; however, the present invention is not limited to this layer, and a plane substrate 42 or the like can be used that is formed with surface asperities having a height of approximately the same order of magnitude as a wavelength of the optical beam. Further, the diffusion layer 43 acting as the optical path difference generating element is assumed to be of the rotation type; however, the optical path difference generating element may be of the stationary type as well.

Although the forgoing description shows that the laser beam source 1 is used for the optical beam source, another type of source such as a mercury lamp or an LED (light emitting diode) may be employed.

The forgoing discussion shows that the glass rod is used as the mixing element for making uniform the optical beam emitted from the optical beam source; however, a Light Pipe™, whose internal surface is configured by mirrors or the like may be utilized.

Although in the above description the optical beam from the optical beam source 1 are assumed to be transmitted through the optical fiber group 2, optical elements such as lenses may be used to make a transmission.

In the foregoing description, a reflective device such as a DMD is used for the display device 5; however, a transmission liquid crystal display panel or the like may also be employed.

What is claimed is:

1. A projection display apparatus, comprising:
   an optical source;
   a mixing element that makes uniform an optical beam emitted from the optical source;

an optical focusing element that focuses an optical beam having passed through the mixing element;

an optical path difference generating element that provides an optical path difference distribution to the optical beam focused using the focusing element, the optical path difference generating element being optically conjugated with an incident end of the mixing element by the focusing element;

a modulator that spatially modulates the optical beam provided with the optical path difference distribution using the optical path difference generating element; and a projection unit that projects on a screen an optical beam modulated using the modulator.

2. The projection display apparatus of claim 1, further comprising a drive unit that drives the optical path difference generating element so that a position through which the optical beam passes varies in the optical path difference generating element.

3. The projection display apparatus of claim 1, further comprising an optical fiber group including a plurality of optical fibers, each fiber transmitting to the mixing element the optical beam emitted from the optical source.

4. The projection display apparatus of claim 1, wherein the optical path difference generating element includes a diffusion member.

5. The projection display apparatus of claim 1, wherein the optical source is a laser beam source that emits a laser beam.

6. The projection display apparatus of claim 2, further comprising an optical fiber group including a plurality of optical fibers, each fiber transmitting to the mixing element the optical beam emitted from the optical source, wherein the optical fiber group has a length of 1.2 through 1.6 meters, and the optical path difference generating element includes a diffusion member having a haze index of 25% through 65%.

7. The projection display apparatus of claim 3, further comprising:
a casing having the screen provided at a front side thereof and the optical source provided at a rear portion thereof; and
an optical unit including the mixing element, the optical focusing element and the modulator, the optical unit being disposed on a bottom of the casing.

8. The projection display apparatus of claim 3, further comprising:
a casing having the screen provided at a front side thereof and the optical source provided on a bottom portion thereof;
an optical unit including the mixing element, the optical focusing element and the modulator, the optical unit being disposed on the bottom of the casing; and
the optical fiber group being extended along the rear side of the casing, to connect the optical source with the optical engine.

9. The projection display apparatus of claim 3, wherein the optical fiber group is positioned along a curve having a radius of 12% through 25% of the diagonal dimension of the screen.

10. A projection display apparatus, comprising:
an optical source;
a mixing element that makes uniform an optical beam emitted from the optical source;
an optical focusing element that focuses an optical beam having passed through the mixing element;
a modulator that spatially modulates the optical beam focused using the optical focusing element;
a projection unit that projects on a screen an optical beam modulated using the modulator; and
an optical path difference generating element that provides an optical path difference distribution to an input optical beam, the optical path difference generating element being disposed at an incident end of the mixing element or at an emitting end of the projection unit.

11. The projection display apparatus of claim 10, further comprising a drive unit that drives the optical path difference generating element so that a position through which the optical beam passes varies in the optical path difference generating element.

12. The projection display apparatus of claim 10, further comprising an optical fiber group including a plurality of optical fibers, each fiber transmitting to the mixing element the optical beam emitted from the optical source.

13. The projection display apparatus of claim 10, wherein the optical path difference generating element includes a diffusion member.

14. The projection display apparatus of claim 10, wherein the optical source is a laser beam source that emits a laser beam.

15. The projection display apparatus of claim 11, further comprising an optical fiber group including a plurality of optical fibers, each fiber transmitting to the mixing element the optical beam emitted from the optical source, wherein the optical fiber group has a length of 1.2 through 1.6 meters, and the optical path difference generating element includes a diffusion member having a haze index of 25% through 65%.

16. The projection display apparatus of claim 12, further comprising:
a casing having the screen provided at a front side thereof and the optical source provided at a rear portion thereof; and
an optical unit including the mixing element, the optical focusing element and the modulator, the optical unit being disposed on a bottom portion of the casing.

17. The projection display apparatus of claim 12, further comprising:
a casing having the screen provided at a front side thereof and the optical source provided at a rear portion thereof;
an optical unit including the mixing element, the optical focusing element and the modulator, the optical unit being disposed on a bottom portion of the casing; and
the optical fiber group being extended along the rear of the casing, to connect the optical source with the optical engine.

18. The projection display apparatus of claim 12, wherein the optical fiber group is positioned along a curve having a radius of 12% through 25% of the diagonal dimension of the screen.

* * * * *